United States Patent [19]

Withers, Jr. et al.

[11] Patent Number: 4,983,373

[45] Date of Patent: Jan. 8, 1991

[54] PROCESS FOR THE PRODUCTION OF HIGH PURITY ZIRCONIUM TETRAFLUORIDE AND OTHER FLUORIDES

[75] Inventors: Howard P. Withers, Jr., Fleetwood; Andrew J. Woytek, Allentown; John T. Lileck, Tamaqua, all of Pa.

[73] Assignee: Air Products and Chemicals, Inc., Allentown, Pa.

[21] Appl. No.: 276,271

[22] Filed: Nov. 23, 1988

[51] Int. Cl.$^5$ .................. C01F 7/50; C01G 25/04; C01G 27/04
[52] U.S. Cl. ................................................ 423/489
[58] Field of Search ............................................ 423/489

[56] References Cited

U.S. PATENT DOCUMENTS

| | | | |
|---|---|---|---|
| 3,473,887 | 10/1969 | Chu et al. | 423/489 |
| 4,578,252 | 3/1986 | Pastor et al. | 423/76 |
| 4,652,438 | 3/1987 | Fulweiler | 423/489 |

FOREIGN PATENT DOCUMENTS

| | | | |
|---|---|---|---|
| 148935 | 1/1950 | Australia | 423/489 |
| 522612 | 3/1956 | Canada | 423/489 |
| 251335 | 11/1987 | German Democratic Rep. | 428/489 |
| 912647 | 3/1982 | U.S.S.R. | 423/489 |
| 1179335 | 3/1967 | United Kingdom | 423/489 |

OTHER PUBLICATIONS

T. Tatsuno; "Synthesis of Iron-Impurity Free ZrF$_4$"; Material Science Forum, vols. 19-20 (1987) pp. 181-185.

M. Robinson; "Processing and Puritication Techniques of Heavy Metal Fluoride Gas (HM7G)"; Journal of Crystal Growth 75(1986) pp. 184-194.

R. C. Fulweiler, Barry C. Farnsworth; "Advances in Chemical Vapor Purification"; 5th Int'l Symp. on Halide Glasses (Jun. 1988) pp. 533-538.

J. A. Sommers, V. Q. Perkins; "Research and Development for Commercial Production of High Purity ZrF$_4$ and HfF$_4$;" 1988, pp. 169-173.

K. Fujiura, Y. Ohishi, S. Sakaguchi, Y. Terunuma; "Synthesis of High Purity ZrF$_4$ by Chemical Vapor Deposition"; 5th Int'l Symp. of Halide Glasses (1988) pp. 174-179.

P. G. Devillebichot; "Zirconium as a Raw Material for Special Glasses"; Glass Technology, vol. 24, No. 3, Jun. 1983; pp. 139-142.

H. M. Haendler, S. F. Bartram, R. S. Becker, W. J. Bernard, S. W. Bukata; "The Reaction of Fluorine with Titanium, Zirconium and the Oxides of Titanium (IV); Zirconium (IV) and Vanadium (V)"; 11-10-53; pp. 2177-2178.

K. Fujiura, Y. Dishi, S. Sakaguchi; "Manufacture of High-Purity Zirconium Tetrafluoride"; Chemical Abstracts 107:157676a, vol. 107, 1987, p. 204.

M. Robinson; "Processing and Purification Techniques of Heavy Metal Fluoride Gas", Journal of Crystal Growth 75 (1986) pp. 184-194.

Withers, H. P. "High Purity Zirconium Tetrafluoride for Fluoride Glass Applications", SPIE, vol. 1048, Infrared Fiber Optics (1989) pp. 72-77.

Primary Examiner—Jeffrey E. Russel
Assistant Examiner—Brian M. Bolam
Attorney, Agent, or Firm—Geoffrey L. Chase; James C. Simmons; William F. Marsh

[57] ABSTRACT

High purity metal fluorides (ZrF$_4$, HfF$_4$, AlF$_3$) are produced by incomplete reaction of metal or their compounds with elemental fluorine and subsequent elevated temperature sublimation of the metal fluoride from the reaction products wherein unreacted metal or metal compounds act as "getters" to convert volatile impurity metal fluorides to non-volatile metals or metal compounds.

17 Claims, No Drawings

PROCESS FOR THE PRODUCTION OF HIGH PURITY ZIRCONIUM TETRAFLUORIDE AND OTHER FLUORIDES

TECHNICAL FIELD

The present invention is directed to making high purity metal fluorides for use in metal fluoride glasses. More specifically, the present invention is directed to the reaction of metal oxides with elemental fluorine incompletely to provide residual metal oxide getters for high purity separation of resulting metal fluorides which are amenable as starting materials for high purity, high performance, low loss glass materials.

BACKGROUND OF THE PRIOR ART

There is a need for high purity metal fluorides such as zirconium tetrafluoride, hafnium tetrafluoride and aluminum trifluoride as components for metal fluoride glass used in optical devices. Current commercial metal fluorides are not pure enough for all present day applications. Existing aqueous processes suffer from problems associated with dehydration of the hydrated metal fluorides. Current anhydrous synthetic routes involve complicated reactor designs.

In the literature article "The Reaction of Fluorine With Titanium, Zirconium and the Oxides of Titanium, Zirconium and Vanadium", by H. M. Haendler, S. F. Bartram, R. S. Becker, W. J. Bernard and S. W. Bukata, Journal of American Chemical Society, 1954, Vol. 76, pages 2177-2178, the reaction of zirconium oxide with fluorine is briefly disclosed. No specific parameters or results are highlighted.

In a literature article "Synthesis of Iron-impurity Free $ZrF_4$" by T. Tatsuno, Materials Science Forum. Vol. 19-20, 1987, pages 181-186, zirconium oxide is physically mixed with zirconium tetrafluoride prior to sublimation of zirconium tetrafluoride. The resulting sublimed zirconium tetrafluoride has a higher purity then sublimed zirconium tetrafluoride that has not been mixed with zirconium oxide.

In a literature article "Processing and Purification Techniques of Heavy Metal Fluoride Glass" by M. Robinson, Journal of Crystal Growth, 1986, Vol. 75, pages 184-194, a discussion of the problems of producing heavy metal fluoride glass using metal fluorides is set forth. Although sublimation and distillation are identified, the existing drawbacks and high impurity levels despite such purification techniques, are highlighted.

U.S. Pat. No. 4,578,252 discloses an attempt to produce high purity metal fluorides using a combination of vaporization and electrolytic separation procedures.

In an article "Advances in Chemical Vapor Purification" by R. C. Folweiler and B. C. Farnsworth, extended abstracts, 5th International Symposium on Halide Glasses, Shizuoka Japan, May 1988, pages 533-537, techniques for production of high purity metal fluorides using advanced chemical vapor purification are set forth. However, as described in the conclusion the products were not suitable for ultra low loss optical fiber although they are suitable for high quality glass materials.

U.S. Pat. No. 4.652.438 describes a process for chemical vapor purification of materials for metal fluorides. The process includes reacting metal with a halide, isolating the metal containing compound and then reacting the metal containing compound with a fluorinating agent.

In a literature article by J. A. Sommers and V. Q. Perkins entitled "Research and Development for Commercial Production of High Purity Zirconium Tetrafluoride and Hafnium Tetrafluoride", extended abstracts, 5th International Symposium on Halide Glasses, Shizuoka Japan, May 1988, pages 169-173. A process is described for producing high purity metal fluorides involving the recrystallization of oxychloride from sublimed chloride with the addition of aqueous hydrogen fluoride to the oxychloride crystals to form zirconium tetrafluoride monohydrate and drying of the resulting monohydrate wet cake. A step of dehydration in flowing hydrogen fluoride yields the anhydrous product with low levels of contaminate metals.

In an article reported in Chemical Abstracts 1987. Vol. 107, Article 157676A by K. Fujiura, et al. the manufacture of high purity zirconium tetrafluoride is described. This is prepared by reacting zirconium tetrabromide with a gaseous fluorine-containing agent. Similar technology was reported by the same authors in extended abstracts 5th International Symposium on Halide Glasses at Shizuoka Japan, May 1988, pages 174-179 in an article entitled "Synthesis of High Purity Zirconium Tetrafluoride By Chemical Vapor Deposition".

An article by P. G. Devillebichot entitled "Zirconium As a Raw Material For Special Glasses", appearing in Glass Technology, 1983. Vol. 24(3), pages 139-142 describes the preparation of zirconium tetrafluoride for special glasses using various reactions requiring the intermediate ammonium fluorozirconate.

All the techniques identified above suffer from complexity and resulting metal fluorides which still do not meet the demanding high standards for fiber optics and other high performance glass incorporating technologies. Appropriate metal fluorides which meet or exceed present demand standards have been achieved by the present invention which is set forth below.

BRIEF SUMMARY OF THE INVENTION

The present invention is a process for producing high purity metal fluorides selected from the group consisting of aluminum trifluoride, hafnium, tetrafluoride and zirconium tetrafluoride, comprising the steps of incompletely reacting the reactants of a fluorinating agent, preferably elemental fluorine with a metal selected from the group consisting of aluminum, hafnium and zirconium, or the corresponding metal compound, preferably its oxide, to produce a reaction product comprising metal fluoride and at least a minor amount of the residual metal or its compound and separating the metal fluoride in high purity from the reaction product by heating the reaction product to selectively vaporize the metal fluoride for separate recovery from the reaction product.

Preferably the minor amount of residual metal or its compound is an amount effective to react with any metallic impurities in the reactants. Optimally the minor amount is in the range of approximately 1 to 50% of the metal fluoride product.

Preferably the metal fluoride is separated by sublimation from the reaction product.

Preferably the reaction comprises reacting zirconium dioxide with elemental fluorine to result in zirconium tetrafluoride.

Preferably the separation is conducted under a vacuum and optimally this vacuum is 95 millimeters of mercury.

Preferably the reaction and recovery is conducted under anhydrous conditions.

Preferably the reaction is conducted at a temperature in the range of approximately 300°–600° C. Preferably the separation is conducted at 850° C.

Preferably the minor amount of metal or its compound reacts with impurity metal fluorides during the separation to produce non-volatile metals or the metal compound.

DETAILED DESCRIPTION OF THE INVENTION

There is currently a need for high purity zirconium tetrafluoride and other metal fluorides as raw materials for making metal fluoride glass. Metal fluoride glass is used in a variety of optical devices with purity being extremely crucial in applications such as windows for high power lasers and optical fiber for ultra low loss telecommunications. For example, in ultra low loss fiber applications, the purity of the metal fluoride must be such that transition metals like iron, cobalt, nickel and copper cannot be present at levels exceeding 0.3, 0.3. 2.0 and 70.0 parts per billion respectively. There is no metal fluoride and particularly zirconium tetrafluoride currently available at this purity level. The best commercially available metal fluorides such as zirconium tetrafluoride are presently specified as containing iron, cobalt, nickel and copper at 500, 50, 500 and 100 parts per billion levels respectively. Furthermore for these applications the oxide and hydroxide functionalities must be kept to a minimum in the product metal fluorides.

A number of techniques are known for producing high purity metal fluorides such as zirconium tetrafluoride for heavy metal fluoride glass applications. These methods can be divided into two categories: (1) anhydrous routes and (2) aqueous routes. All of the aqueous routes produce hydrated metal fluorides such as zirconium tetrafluoride monohydrate. This necessitates the need to remove the water of hydration, which makes it difficult to minimize the oxide and hydroxide content. The aqueous route can provide very low transition element concentrations in the hydrated metal fluorides such as zirconium tetrafluoride monohydrate, but the low levels are not maintained during the dehydration step. The anhydrous routes solve some of the problems associated with oxide and hydroxide contamination, but create other problems due to the complex engineering design needed to accomplish the high temperature vapor-phase reactions in the presence of corrosive hydrogen fluoride or elemental fluorine.

In contrast, the present invention is performed by the following exemplary technique. Zirconium dioxide powder is placed on a non-contaminating, non-reactive tray (such as high density, sintered aluminum oxide). The tray is placed inside a tubular reactor made of non-reactive material (such as nickel or sintered aluminum oxide) and purged with nitrogen, the reactor is heated to 250°–600° C. and fluorine ($F_2$) gas is fed through the reactor at concentrations of 5–100% in nitrogen with a flow rate of 0.025–10.0 liters/minute. Useful reactivity occurs at 350° C. with 50–75% fluorine at 150–200 standard cubic centimeters per minute total flow. Over the course of the conversion the temperature is increased to 550° C. with 100% fluorine at 100–200 standard cubic centimeters per minute. The fluorine concentration and flow rate will depend greatly on the size of the charge in the reactor and its heat removal efficiency. The reaction temperature is more critical in determining the extent of reaction. The preferred temperature range is 300°–600° C. The conversion of zirconium dioxide to zirconium tetrafluoride is 50–99% and most typically 90–97%. For the invention, it is preferred to be 95% but never in the approximate range of 100%. The zirconium dioxide should be of high purity with iron being less than 50 parts per million. Successful performance has been found with Magnesium Elektron's G10 grade (iron=5–10 ppm) and E. Merck's Optipur grade (iron=1 ppm). Successful runs have used technical grade, 97.0% fluorine.

The next stage of the process involves sublimation of the zirconium tetrafluoride away from the unreacted zirconium dioxide. The crude product from the fluorination reactor is pulverized to a powder by grinding in noncontaminating mills (such as sintered aluminum oxide). The powder is placed in a vitrous carbon or sintered aluminum oxide crucible and a vitreous carbon crucible (the receiver) is placed mouth-to-mouth against the crucible containing the accrued powder. The two crucibles are contained in a quartz or sintered aluminum oxide vessel so that the atmosphere and pressure can be controlled. The vessel is heated slowly (1°–5° C./min.) to 650°–925° C. at a pressure of 0.1–760 millimeters of mercury for sufficient time to sublime all the available zirconium tetrafluoride. The preferred conditions are a heating rate of 1° C./minute to a temperature of 850° C. at a pressure of 95 mm of mercury. The recovery of available zirconium tetrafluoride is 94–98%. Thus, the overall yield of zirconium tetrafluoride from the starting zirconium dioxide is 91%, although this is not critical. In fact, lower conversion of oxide to fluoride is preferred for the maximum "getter" activity in reducing impurity levels during sublimation.

The zirconium tetrafluoride obtained by the process described above has been shown by spark source mass spectrometry and graphite furnace/atomic absorption spectroscopy analyses to contain metal contaminants below existing detection levels such as iron below 20 parts per billion, cobalt less than 50 parts per billion (DL), nickel below 20 parts per billion and copper less than 20 parts per billion (DL). These impurity levels are lower than any other commercially available zirconium tetrafluoride. The process is capable of lowering the iron concentration from 7,500 (average) parts per billion in the zirconium dioxide to less than 20 parts per billion in the zirconium tetrafluoride. By comparison, calculations and experimental data have shown that simply subliming zirconium tetrafluoride, containing 4,000 parts per billion iron and no oxide, cannot reduce the iron below 1,000 parts per billion. The key to the invented process is the unreacted zirconium dioxide which acts in a similar manner to that described when zirconium dioxide is physically mixed with zirconium tetrafluoride after production of zirconium tetrafluoride. The affect of the zirconium dioxide is to act as a "getter" for the impurity fluorides in such a way that the impurity fluorides are converted to non-volatile oxides, while zirconium dioxide is converted to zirconium oxyfluorides. Another aspect of limiting the conversion to less than 100% in the production of zirconium tetrafluoride from zirconium oxide and elemental fluorine, is that this will limit the conversion of nonvolatile impurity oxides in the starting of zirconium dioxide to volatile impurity fluorides.

This invention is different from previous processes for the production of metal fluorides and is of unique value for several reasons. The present invention is essentially a combination of two process techniques, one which is the reaction of zirconium dioxide with fluorine to produce zirconium tetrafluoride and the other is the mixing of zirconium dioxide with zirconium tetrafluoride to improve purification during sublimation. The result of this combination is a unique enhancement of the production and purification technology for metal fluorides which creates a novel process which is better than the individual steps. By limiting the conversion of zirconium dioxide to zirconium tetrafluoride in the fluorination reaction, one is able to form an intimate mixture between the zirconium dioxide and zirconium tetrafluoride and thus eliminate the need to separately prepare zirconium tetrafluoride and then mechanically mix it with zirconium dioxide. Furthermore, the degree of mixing of zirconium dioxide with the zirconium tetrafluoride from the process of the present invention is extremely high because it is on a molecular scale, since the zirconium tetrafluoride is formed directly from the zirconium dioxide. As a result, the technique of the present invention, using zirconium dioxide as a getter in the zirconium tetrafluoride purification, is vastly superior to the subsequent mixing of zirconium dioxide with previously formed zirconium tetrafluoride during purification post processing.

The value of the present invention process is further enhanced by the strictly anhydrous condition dictated by the reaction chemistry maintained through the use of elemental fluorine such that no water is used or produced and that any extraneous water present is readily scavenged by reaction with fluorine. The low oxygen content of the zirconium tetrafluoride product is evidenced by oxygen analysis, using the inert gas fusion technique, showing less than 10 ppm oxygen, which is the detection limit of the technique.

The improved purity of the zirconium tetrafluoride produced by this novel process was further demonstrated by optical absorption data obtained on heavy metal fluoride glass prepared using the zirconium tetrafluoride. Absorption of light in the ultra-violet region of the spectrum was substantially lower than for heavy metal fluoride glass prepared from other high purity zirconium tetrafluoride of both commercial and research and development sources. Also, very low optical loss of 6.3 dB/km was achieved through a fiber of 150 meters in length made from this zirconium tetrafluoride, resulting in a significant improvement over that from currently commercially available zirconium tetrafluoride. Similar enhancements in hafnium fluoride, aluminum fluoride and other metal fluorides can be achieved.

In light of the exacting and extreme standards demanded for metal fluorides used in high performance laser and fiber optic applications, it has become more and more difficult to achieve significant reductions in impurity levels and loss parameters in the resulting glass materials. The choice of reaction technique in employing incomplete reaction of metal or metal oxide with elemental fluorine and the use of this incompletely reacted product in a separation technique, wherein the metal or its metal oxide operates as an intimately mixed molecular level getter for impurities provides a unique and surprising enhancement of metal fluorides which commercially at present already have very high purities, but which present techniques of the present invention allow the metal fluorides to achieve heretofore unachievable standards making it acceptable for heavy metal fluoride glass applications in the most exacting performance standards, results in the present invention demonstrating superior processing properties over the prior art.

Although the present invention has been described and exemplified by the preferred example of zirconium oxide and fluorine to produce zirconium tetrafluoride, it should be understood that it is equally applicable to hafnium, aluminum and zirconium metal, oxides, carbonates, nitrates and sulfonates, which can be reacted with other fluorinating agents such as $NF_3$, $N_2F_2$, $N_2F_4$, $ClF_3$, $BrF_3$, $IF_5$ and $SF_4$. In addition, the separation can be done at atmospheric pressure as well as under vacuum. Typical of the metal glass that can be produced from the metal fluoride products of this process are "ZBLAN" glass composed of zirconium, barium, lanthanum, aluminum, and sodium fluorides in a glass amorphous matrix.

The present invention has been set forth with regard to a preferred embodiment, however, it is appreciated that the invention scope should be ascertained from the claims which follow.

We claim:

1. A process for producing metal fluorides for low optical loss glass applications selected from the group consisting of aluminum trifluoride, hafnium tetrafluoride and zirconium tetrafluoride, comprising the steps of:
   (a) incompletely reacting reactants of a fluorinating agent selected from the group consisting of $F_2$, $NF_3$, $N_2F_2$, $N_2F_4$, $ClF_3$, $BrF_3$, $IF_5$ and $SF_4$ and a metal selected from the group consisting of aluminum, hafnium and zirconium, or the corresponding metal's compound to produce a reaction product comprising the metal fluoride and at least an amount of the residual metal or its compound effective to react with any metal fluoride impurities in the reactants, and
   (b) separating the metal fluoride from the reaction product by heating the reaction product to selectively vaporize the metal fluoride for separate recovery from the reaction product and to react the residual metal or its compound with said metal fluoride impurities.

2. The process of claim 1 wherein the metal fluoride is separated by sublimation from the reaction product.

3. The process of claim 1 wherein zirconium dioxide is reacted with elemental fluorine.

4. The process of claim 1 wherein the separation is conducted under a vacuum.

5. The process of claim 1 wherein the reaction and recovery is conducted under anhydrous conditions.

6. The process of claim 1 wherein the reaction is conducted at a temperature in the range of approximately 300° to 600° C.

7. The process of claim 1 wherein the separation is performed at conditions of approximately 850° C. and 95 mm Hg vacuum.

8. The process of claim 1 wherein the separation is conducted at atmospheric pressure.

9. The process of claim 1 wherein the metal or metal compound is selected from the group consisting of aluminum, hafnium, zirconium and their oxides, carbonates, nitrates and sulfonates.

10. A process for producing metal fluorides for low optical loss glass applications selected from the group consisting of aluminum trifluoride, hafnium tetrafluoride and zirconium tetrafluoride, comprising the steps of:

(a) incompletely reacting reactants of elemental fluorine and a metal selected from the group consisting of aluminum, hafnium and zirconium, or the corresponding metal's oxide to produce a reaction product comprising the metal fluoride and at least an amount of the residual metal or its oxide effective to react with any metal fluoride impurities in the reactants, and (b) separating the metal fluoride in high purity from the reaction product by heating the reaction product to selectively vaporize the metal fluoride for separate recovery from the reaction product and to react said residual metal or its oxide with said metal fluoride impurities.

11. The process of claim 10 wherein the metal fluoride is separated by sublimation from the reaction product.

12. The process of claim 10 wherein zirconium dioxide is reacted with elemental fluorine.

13. The process of claim 10 wherein the separation is conducted under a vacuum.

14. The process of claim 10 wherein the reaction and recovery is conducted under anhydrous conditions.

15. The process of claim 10 wherein the reaction is conducted at a temperature in the range of approximately 300° to 600° C.

16. The process of claim 10 wherein the separation is performed at conditions of approximately 850° C. and 95 mm Hg vacuum.

17. The process of claim 10 wherein the separation is conducted at atmospheric pressure.

* * * * *